(12) United States Patent
Takenoshita et al.

(10) Patent No.: US 12,256,171 B2
(45) Date of Patent: Mar. 18, 2025

(54) DATA TRANSMISSION DEVICE AND DATA TRANSMISSION METHOD

(71) Applicant: LAPIS Technology Co., Ltd., Yokohama (JP)

(72) Inventors: Tadashi Takenoshita, Yokohama (JP); Tomoyuki Ichikawa, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/581,377

(22) Filed: Feb. 20, 2024

(65) Prior Publication Data

US 2024/0291943 A1    Aug. 29, 2024

(30) Foreign Application Priority Data

Feb. 28, 2023  (JP) .................................. 2023-030374

(51) Int. Cl.
*H04N 7/035* (2006.01)
*H04N 7/54* (2006.01)

(52) U.S. Cl.
CPC ............. *H04N 7/0357* (2013.01); *H04N 7/54* (2013.01)

(58) Field of Classification Search
CPC .......... H04N 7/0357; H04N 7/54; H04N 5/38; H04N 7/083; H04N 21/43632; G09G 5/003; H04L 69/16; H04L 65/65; H04L 65/75
See application file for complete search history.

(56) References Cited

U.S. PATENT DOCUMENTS

| | | | | |
|---|---|---|---|---|
| 2008/0089253 | A1* | 4/2008 | Goto | .................... H04L 12/2854 |
| | | | | 370/282 |
| 2013/0339998 | A1* | 12/2013 | Arme | .................. H04N 21/4722 |
| | | | | 725/32 |
| 2019/0312611 | A1* | 10/2019 | Kumaki | .................... H04B 5/20 |

FOREIGN PATENT DOCUMENTS

JP        2022546947        11/2022

* cited by examiner

*Primary Examiner* — Michael E Teitelbaum
(74) *Attorney, Agent, or Firm* — JCIPRNET (57) ABSTRACT

A data transfer device includes: a video transmission circuit 24, transmitting video data from a first device 10 to a second device 50 during a video period as a timing of transmitting the video data; a transmission part 32, 72, transmitting non-video data between the first device 10 and the second device 50 during a video blanking period as a timing of transmitting the non-video data; and a monitoring part 30, 70, during the video blanking period, controlling the transmission part 32, 72 to stop transmission of the non-video data from the second device 50 to the first device 10 in response to presence of a signal from the first device 10 and stop transmission of the non-video data from the first device 10 to the second device 50 in response to presence of a signal from the second device 50.

9 Claims, 7 Drawing Sheets

DATA TRANSMISSION DEVICE AND DATA TRANSMISSION METHOD

CROSS-REFERENCE TO RELATED APPLICATION

This application claims priority under 35 USC 119 from Japanese Patent application No. 2023-030374 filed on Feb. 28, 2023, the disclosure of which is incorporated by reference herein.

BACKGROUND

Technical Field

The disclosure relates to a data transmission device and a data transmission method that avoid data signal conflict.

Description of Related Art

In recent years, vehicles are often equipped with cameras, such as vehicle surrounding monitoring systems or drive recorders. There is a demand for various control for these cameras, firmware updates, etc. to be performed from the control devices to which the cameras are connected.

In analog video data transmission, a process in which non-video data, such as inter-integrated circuit (I2C) data are superimposed on an analog signal in addition to video is used. Non-video data are transmitted and received during a video blanking period, so as not to affect the video signal. However, the specification at the time of transmitting the non-video data is not defined. Therefore, at the time of transmitting the non-video data, it is necessary to perform communication safely without causing signal conflict during data transmission due to bidirectional communication.

Japanese Laid-open No. 2022-546947 discloses an invention in which the maximum differential voltage generated by a differential clock signal is smaller than the maximum differential voltage of a clock transmission module, and, in a data transmission cycle under a dynamic operating condition, the length of the initial clock period of the initial clock cycle of the clock pulse stream is longer than the initial clock period of a subsequent clock cycle and shorter than the period required for achieving the maximum differential voltage.

However, according to the disclosure disclosed in Japanese Laid-open No. 2022-546947, other data being superimposed with the signal is not considered, and signal conflicts may occur during data transmission through bidirectional communication.

The disclosure provides a data transmission device and a data transmission method that avoid data signal conflicts.

SUMMARY

An aspect of the disclosure provides a video data transmission part, a non-video data transmission part, and a monitoring part. The video data transmission part transmits video data from a first device to a second device during a video period as a timing of transmitting the video data. The non-video data transmission part transmits non-video data between the first device and the second device during a video blanking period as a timing of transmitting the non-video data. The monitoring part, during the video blanking period, controls the non-video data transmission part, so as to set a conflict determination period preceding an interval transmitting the non-video data as a first period in which only the first device is able to transmit a signal and, in response to presence of the signal from the first device, stop transmission of the non-video data from the second device to the first device.

Another aspect of the disclosure provides a data transmission method. The data transmission method includes: a video data transmission process of transmitting video data from a first device to a second device during a video period as a timing of transmitting the video data; a monitoring process of, in a video blanking period as a timing of transmitting non-video data, during a conflict determination period preceding an interval transmitting the non-video data, stopping transmission of the non-video data from the second device to the first device in response to presence of a signal from the first device and stopping transmission of the non-video data from the first device to the second device in response to presence of a signal from the second device; and a non-video data transmission process of, in the monitoring process, during the conflict determination period, executing the transmission of the non-video data from the second device to the first device in response to absence of the signal from the first device and executing the transmission of the non-video data from the first device to the second device in response to absence of the signal from the second device.

DESCRIPTION OF THE EMBODIMENTS

In a case where a signal from the other party is present during the conflict determination period that precedes the interval transmitting the non-video data, data signal conflict can be avoided by stopping non-video data transmission.

First Embodiment

Figure 1:
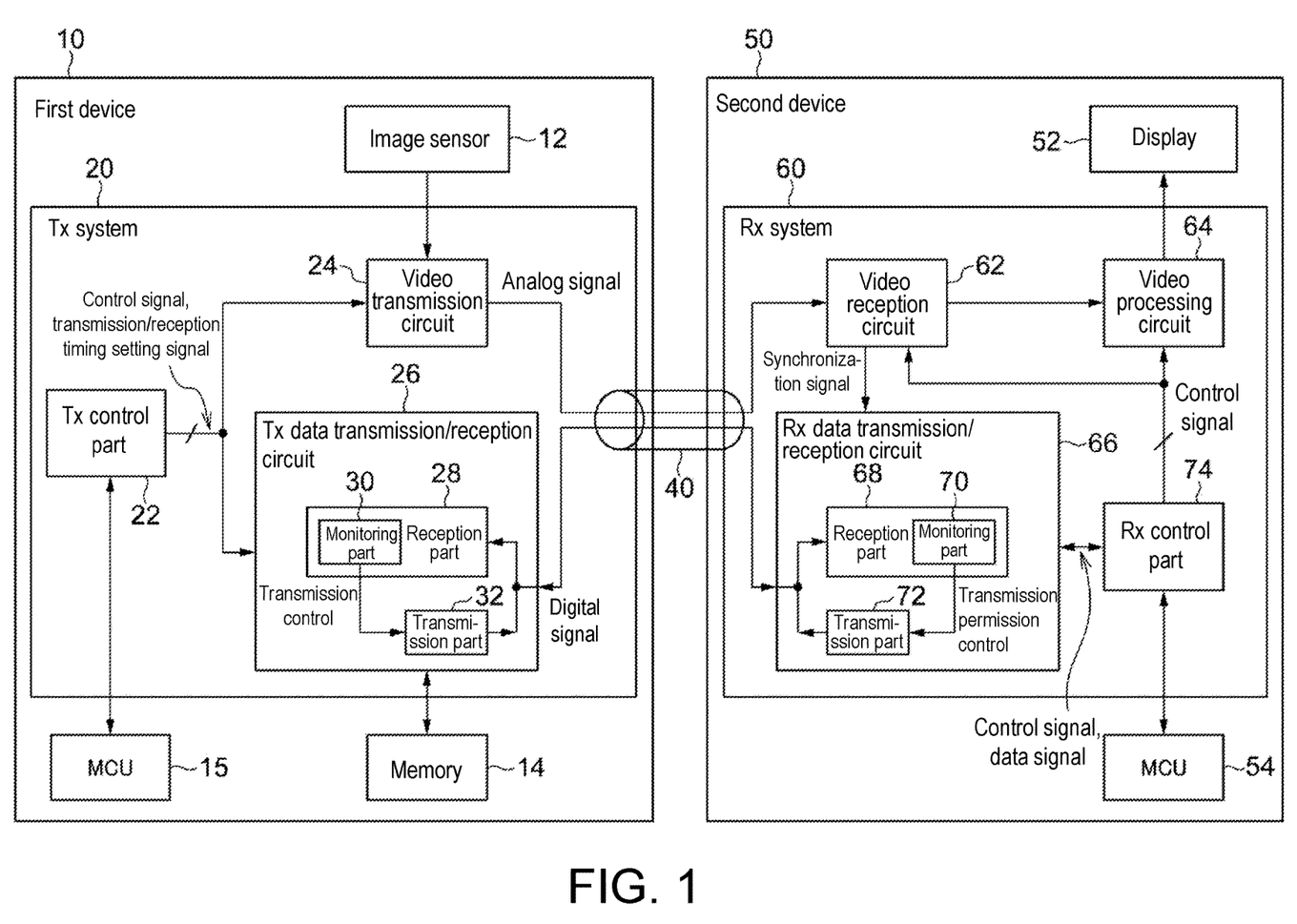
FIG. 1 is a block diagram illustrating an example of a configuration of a first device and a second device according to a first embodiment.

FIG. 1 is a block diagram illustrating an example of a configuration of a first device 10 and a second device 50 according to the embodiment. The first device 10 is an image capturing device, such as a camera, and the second device 50 is a car navigation device, for example, or an automatic driving device, etc., of a vehicle. The first device 10 may also be a monitoring camera, and the second device 50 may also be a control device of the monitoring camera. The first device 10 and the second device 50 are connected via an analog transmission cable 40. The analog transmission cable 40 is used to transmit video data obtained by the first device 10 to the second device 50 and transmit non-video data, such as a control signal, between the first device 10 and the second device 50.

The first device 10 includes an image sensor 12, a memory 14, and a Tx system 20. The image sensor 12 obtains video data of a target by receiving light emitted from the target and converting the brightness of the light into an electrical signal. The memory 14 is a storage device, such as a flash memory. The Tx system 20 transmits the video data obtained by the image sensor 12 to the second device 50 via the analog transmission cable 40.

The Tx system 20 includes a video transmission circuit 24 and a Tx data transmission/reception circuit 26. The video transmission circuit 24 transmits video data as an analog signal, and the Tx data transmission/reception circuit 26 transmits/receives non-video as a digital signal of I2C data, etc., with the second device 50. Each of the video transmission circuit 24 and the Tx data transmission/reception circuit 26 is controlled by a Tx control part 22.

The Tx control part 22 outputs control signals for respectively controlling the video transmission circuit 24 and the Tx data transmission/reception circuit 26 to the video transmission circuit 24 and the Tx data transmission/reception circuit 26, respectively, and outputs a transmission/reception timing setting signal for performing transmission/reception control to the video transmission circuit 24 and the Tx data transmission/reception circuit 26, respectively. In the embodiment, a video period for transmitting the video data and a video blanking period for transmitting the non-video data are in the transmission timing, and the transmission/reception timing setting signal output by the Tx control part 22 sets the video period and the video blanking period in the transmission timing.

The Tx data transmission/reception circuit 26 includes a reception part 28 and a transmission part 32. The reception part 28 receives the digital signal transmitted from the second device 50, and the transmission part 32 transmits the digital signal to the second device 50. The reception part 28 includes a monitoring part 30. The monitoring part 30 controls the transmission part 32, so that, in the case where a conflict determination period is provided in the transmission timing and data is transmitted from the transmission side during the conflict determination period, data transfer from the reception side to the transmission side is stopped to avoid signal conflict. In the embodiment, as described above, the video period in which the video data is transmitted and the video blanking period in which the non-video data is transmitted are set in the transmission/reception timing setting signal output by the Tx control part 22. However, as described in the following, the conflict determination period is provided in the video blanking period to control transmission to avoid signal conflict.

The memory 14 stores, for example, a program, such as firmware, controlling the image capturing function of the first device 10. The program, such as firmware, stored in the memory 14 is updated by using the digital signal from the second device 50.

The second device 50 includes an Rx system 60, a display 52, and a micro control unit (MCU) 54. The Rx system 60 receives the video data, the display 52 displays the received video data, and the MCU 54 controls the Rx system 60.

The Rx system 60 includes a video reception circuit 62, a Rx data transmission/reception circuit 66, a video processing circuit 64, and a Rx control part 74. The video reception circuit 62 receives the video data as an analog signal. The Rx data transmission/reception circuit 66 transmits and receives the digital signal of I2C data, etc., with the first device 10. The video processing circuit 64 processes the received video data into a state able to be displayed on the display 52. The Rx control part 74 is a subordinate control device of the MCU 54. The video reception circuit 62, the video processing circuit 64, and the Rx data transmission/reception circuit 66 are respectively controlled by the Rx control part 74.

The Rx control part 74 outputs the control signals for controlling the video reception circuit 62, the video processing circuit 64, and the Rx data transmission/reception circuit 66 to the video reception circuit 62, the video processing circuit 64, and the Rx data transmission/reception circuit 66, respectively. In addition, the video reception circuit 62 generates a synchronization signal indicating a difference between the video period and the video blanking period in the Rx system 60 of the second device 50 according to the time at which the video signal is received from the first device 10, and outputs the synchronization signal to the Rx data transmission/reception circuit 66.

The Rx data transmission/reception circuit 66 includes a reception part 68 and a transmission part 72. The reception part 68 receives the digital signal transmitted from the first device 10, and the transmission part 72 transmits the digital signal to the first device 10. The reception part 68 includes a monitoring part 70. The monitoring part 70 controls the transmission part 72, so that, in the case where a conflict determination period is provided in the transmission timing and data is transmitted from the transmission side during the conflict determination period, data transfer from the reception side to the transmission side is stopped to avoid signal conflict.

Figure 2:
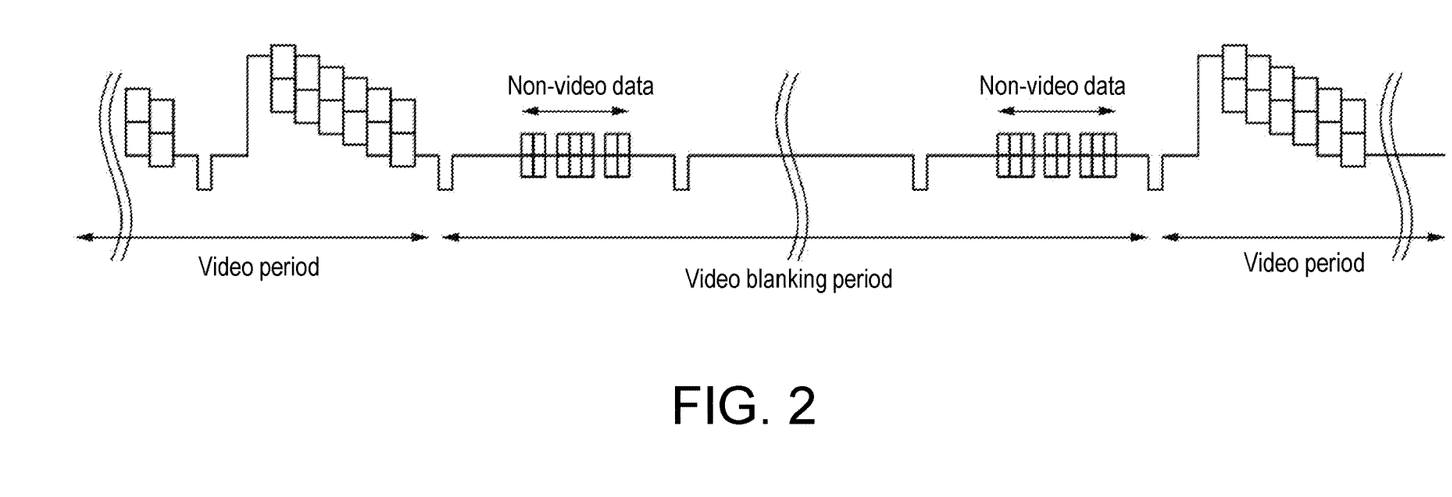
FIG. 2 is a diagram explaining an example of transmission timings of video data and non-video data.

FIG. 2 is a diagram explaining an example of the transmission timings of the video data and the non-video data. As shown in FIG. 2, in analog video signal transmission, a process in which data (non-video data such as I2C data) other than video is superimposed on the analog signal is used. The transmission/reception of non-video data is performed during the video blanking period, so as not to affect the video signal. When performing transmission without defining the specification at the time of transmitting non-video data, it is necessary to avoid data signal conflict to safely perform communication. In the embodiment, the transmission timing of the data signal at the transmission side (Tx) and the reception side (Rx) is determined in advance, so that signal conflict due to bidirectional communication does not occur during the transmission of non-video data, and data signal conflict is avoided. In addition, when detecting a data signal out of an expected timing, the reception side (Rx) stops the data signal transmission to avoid data conflict.

Figure 3:
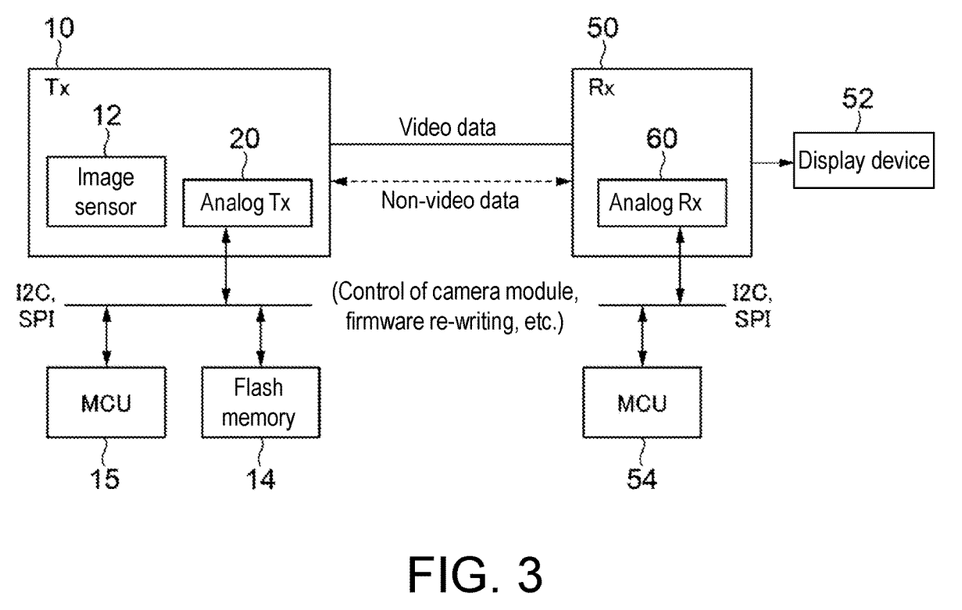
FIG. 3 is a diagram explaining an example of camera module control through non-video data transmission.

FIG. 3 is a diagram explaining an example of camera module control through non-video data transmission. As shown in FIG. 2, in analog video signal transmission, a process in which non-video data as a digital signal, such as I2C data, is superimposed on the analog signal is used. The analog video signal obtained by the image sensor 12 provided in the first device 10 is transmitted from the Tx system 20, which is the transmission side, to the Rx system 60, which is the reception side of the second device 50, via the analog transmission cable 40, and is displayed on the display 52 as a display device. It may also be that the MCU 15 or the storage 14 and the MCU 54 are not included in the first device 10 and the second device 50, respectively, but are connected via buses. FIG. 3 illustrates a configuration differing from the configuration of FIG. 1 in that the MCU 15, the memory 14, and the MCU 54 are not included in the first device 10 and the second device 50, respectively.

In addition, the I2C data as non-video data is an instruction signal to the camera module formed by the image sensor 12 and the Tx system 20, for example, and is a notification signal to the MCU 15, for example. More specifically, through the control of the MCU 54, the control signal of the camera module, the signal for firmware re-writing, etc., of the camera module, and the command for communication with the MCU 15 are transmitted from the second device 50 to the first device 10 via the Rx control part 74. The I2C data is, for example, transmitted via a serial bus, such as a serial peripheral interface (SPI). For example, in the case where the I2C data is a signal for re-writing the firmware of the camera module, through the control of the MCU 54, a signal for rewiring new firmware is transmitted from the second device 50 to the first device 10 as non-video data and stored in the memory 14, and, in the case where the I2C data is a command to the MCU 15, for example, the I2C data notifies the MCU 15 via the serial bus, etc.

In the case where the command to the camera module, the re-writing of the firmware, the command notification to the MCU 15, etc., is completed, in accordance with needs, a signal indicating that the re-writing of the firmware is completed is transmitted as I2C data from the Tx system 20 of the first device 10 to the MCU 54 of the second device 50 via the serial bus, such as SPI.

Figure 4:
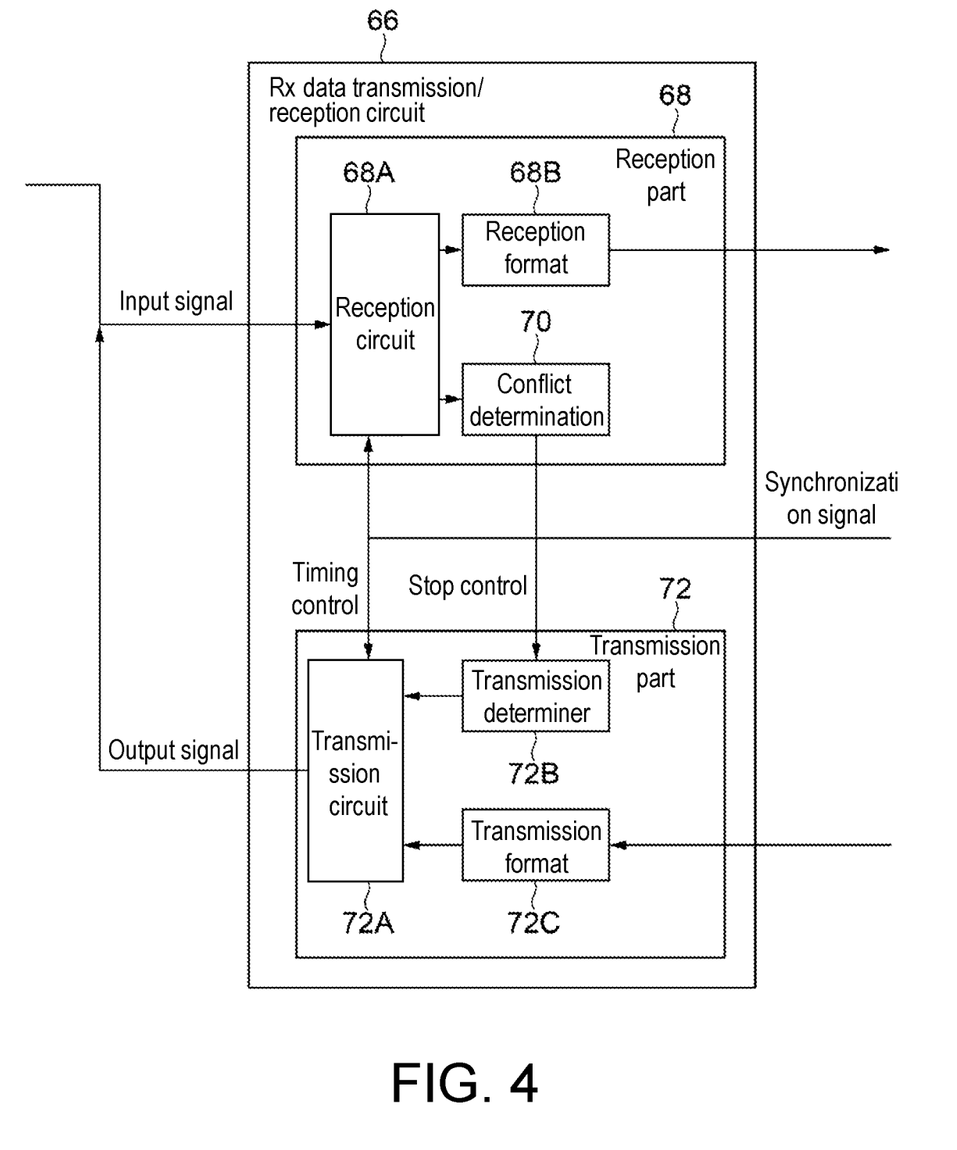
FIG. 4 is a block diagram illustrating an example of a detailed configuration of an Rx data transmission/reception circuit.

FIG. 4 is a block diagram illustrating an example of a detailed configuration of the Rx data transmission/reception circuit 66. The Rx data transmission/reception circuit 66 includes a reception part 68 and a transmission part 72. The reception part 68 receives the digital signal transmitted from the first device 10, and the transmission part 72 transmits the digital signal to the first device 10.

The reception part 68 includes a reception circuit 68A, a reception format 68B, and the monitoring part 70. The reception circuit 68A receives an input signal, which is I2C data, as a signal indicating that the re-writing of the firmware is completed, etc. The reception format 68B converts the received I2C data into a format that can be interpreted by the Rx control part 74. The monitoring part 70 provides a conflict determination period during the video blanking period, which is the transmission timing of non-video data, and performs conflict determination in the case where data is transmitted from the transmission side during the conflict determination period. The monitoring part 70 performing conflict determination outputs a stop control signal for stopping the data transfer from the reception side to the transmission side to the transmission part 72, and controls the transmission part 72 to avoid signal conflict.

The signal for controlling the camera module through the control of the MCU 54 and the signal for re-writing the firmware of the camera module, etc., are input to the transmission part 72 via the Rx control part 74. The signal input via the Rx control part 74 is converted into the format of I2C data by a transmission format 72C and transmitted to a transmission circuit 72A. In the case where transmission is not stopped according to a transmission determiner 72B, the transmission circuit 72A transmits the input I2C data to the first device 10.

A synchronization signal is input from the video reception circuit 62 to each of the transmission circuit 72A and the reception signal 62A. In the embodiment, as described above, the video period transmitting video data and the video blanking period transmitting non-video data are set, and the video reception circuit 62 receives the video data from the first device 10 during the video period. The synchronization signal output by the video reception circuit 62 to each of the transmission circuit 72A and the reception circuit 68A indicates the distinction between the video period and the video blanking period in the Rx system 60 of the second device 50. Each of the transmission circuit 72A and the reception circuit 68A avoids signal conflict between video data and non-video data by performing I2C data that is non-video data during the video blanking period indicated by the synchronization signal that is input.

In the embodiment, although the video data is transmitted unidirectionally from the first device 10 to the second device 50, the non-video data is transmitted bidirectionally between the first device 10 and the second device 50. As described above, in the embodiment, the monitoring part 70 of the reception part 68 performs conflict determination in the case where data is transmitted from the transmission side during the conflict determination period in the video blanking period, and outputs a stop control signal for stopping the data transfer from the reception side to the transmission side to the transmission determiner 72B of the transmission part 72. The transmission determiner 72B receiving the stop control signal stops the transmission of the transmission circuit 72A and avoids signal conflict.

Figure 5:
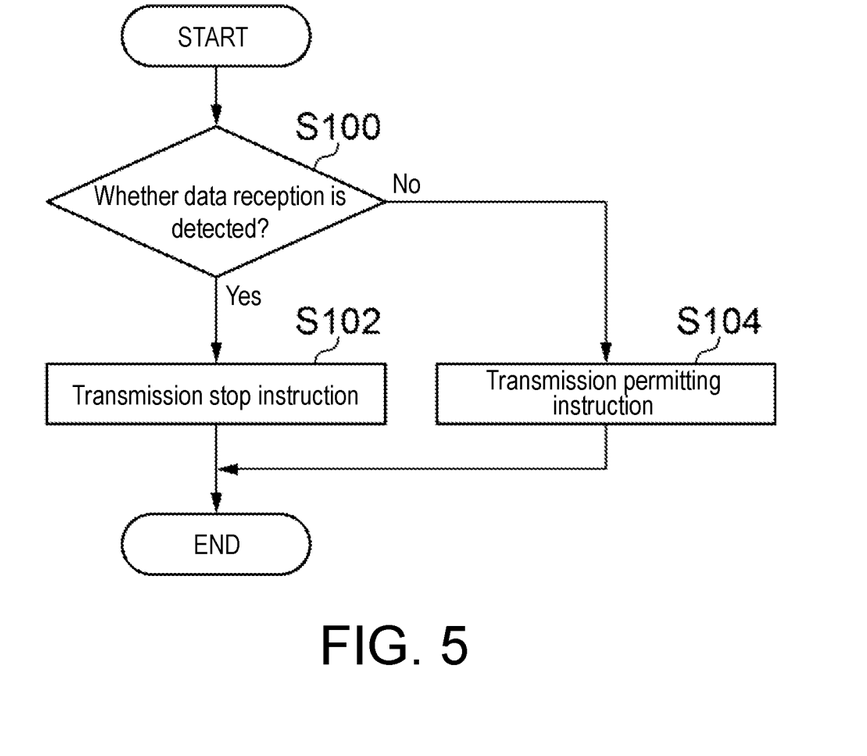
FIG. 5 is a flowchart illustrating an example of a process of non-video data transmission/reception control in a monitoring part of a Tx data transmission/reception circuit or a monitoring part of the Rx data transmission/reception circuit.

FIG. 5 is a flowchart illustrating an example of a process of transmission/reception control of the non-video data in the monitoring part 30 of the Tx data transmission/reception circuit 26 or the monitoring part 70 of the Rx data transmission/reception circuit 66. The process shown in FIG. 5 is started when the first device 10 and the second device 50 respectively become able to communicate.

In Step 100, whether data reception from the other party (the Rx data transmission/reception circuit 66 in the case where the Tx data transmission/reception circuit 26 is the reception side and the Tx data transmission/reception circuit 26 in the case where the Rx data transmission/reception circuit 66 is the reception side) is detected during the conflict determination period in the video blanking period is determined. In Step S100, in the case where data reception is detected, the procedure proceeds to Step S102, and in the case where data reception is not detected, the procedure proceeds to Step S104.

In Step S102, conflict determination is performed, and a stop instruction for stopping data transfer from the reception side to the transmission side is output to the transmission part 32 or the transmission part 72, and the process is ended.

In Step S104, conflict determination is not performed, the stop instruction for stopping data transfer from the reception side to the transmission side is not output, transmission of I2C data according to the transmission part 32 or the transmission part 72 is permitted, and the process is ended.

As shown in FIGS. 2 and 5, in the transmission system in which the analog video signal is transmitted between the first device 10 and the second device 50 and data other than video (non-video data, such as the I2C data) is superimposed and transmitted bidirectionally during the video blanking period, each device includes the transmission circuit and the reception circuit of non-video data, and is controlled to perform transmission at a non-video data transmission/reception timing set in advance.

In addition, the reception circuit on the reception side includes a signal conflict monitoring part (the monitoring part 30 or the monitoring part 70), stops the transmission according to the transmission part 32 or the transmission part 72 when a data signal from the transmission side is detected during the conflict determination period, and permits the transmission according to the transmission part 32 or the transmission part 72 when there is no data signal from the transmission side.

Figure 6A:
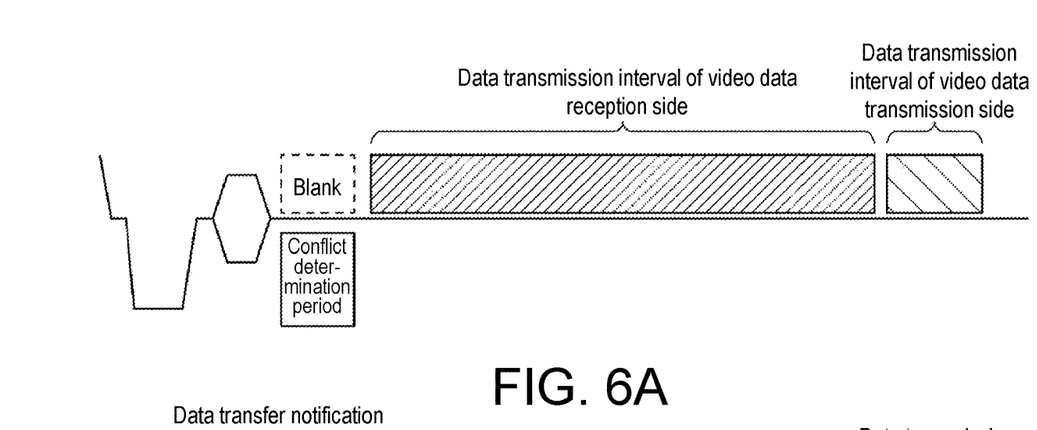
FIG. 6A is a diagram explaining an example of a transmission timing of non-video data to the first device, which is a video data transmission side, from the second device, which is a video data reception side.
Figure 6B:
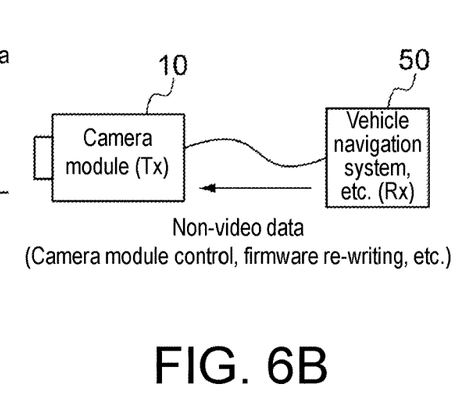
FIG. 6B is a schematic diagram illustrating a transmission image of the non-video data from the second device to the first device.
Figure 6C:
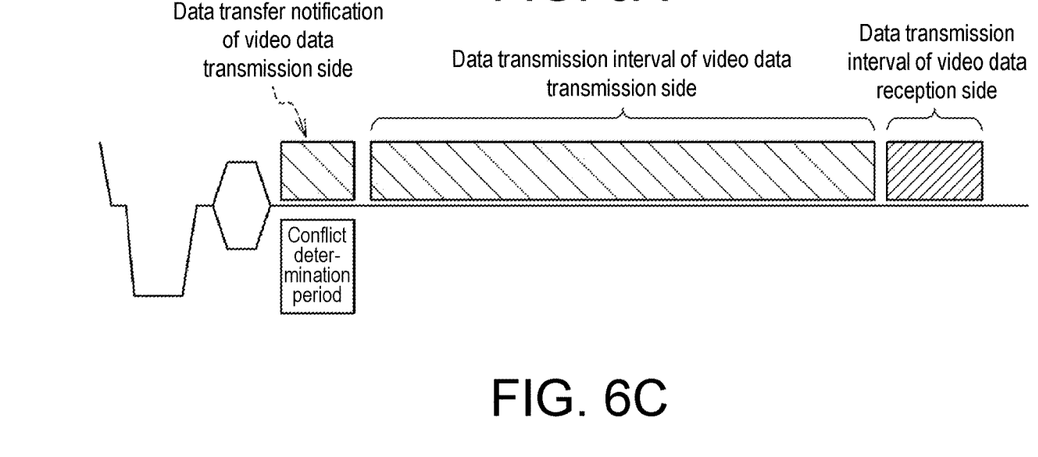
FIG. 6C is a diagram explaining an example of a transmission timing of non-video data to the second device, which is the video data reception side, from the first device, which is the video data transmission side.
Figure 6D:
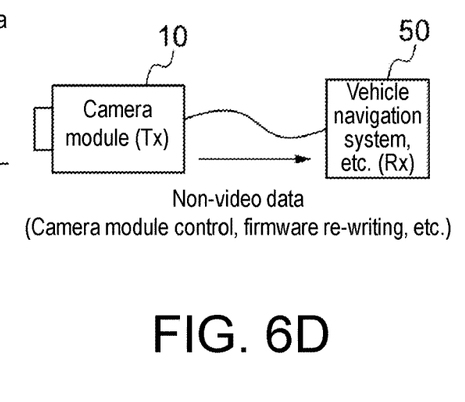
FIG. 6D is a schematic diagram illustrating a transmission image of the non-video data from the first device to the second device.

FIG. 6A is a diagram explaining an example of the transmission timing of non-video data to the first device 10, which is the video data transmission side, from the second device 50, which is the video data reception side. FIG. 6B is a schematic diagram illustrating a transmission image of non-video data from the second device 50 to the first device 10. FIG. 6C is a diagram explaining an example of the transmission timing of non-video data to the second device 50, which is the video data reception side, from the first device 10, which is the video data transmission side. FIG. 6D is a schematic diagram illustrating a transmission image of the non-video data from the first device 10 to the second device 50.

In the embodiment, the transmission and reception of the non-video data can be from either side, as shown in FIGS. 6B and 6D.

As shown in FIGS. 6A and 6C, in the embodiment, the conflict determination period is provided at the beginning of line transfer during the video blanking period, the transmission of data signals between the transmission side and the reception side is performed according to the result of the conflict determination. In the embodiment, the prioritized device is determined in advance, and only the prioritized device can transmit a signal during the conflict determination period. As shown in FIGS. 6A and 6C, the case where the transmission of non-video data from the first device 10 to the second device 50 is prioritized is shown, and only the first device 10 transmits a signal during the conflict determination period.

As shown in FIG. 6A, in the case where the monitoring part 70 of the second device 50 determines that there is no signal (blank) in the conflict determination period, the data transmission of non-video data to the first device 10 is executed during a video data reception side data transmission interval of FIG. 6A.

As shown in FIG. 6C, in the case where the monitoring part 70 of the second device 50 determines that there is a signal, such as a video data transmission side data transfer notification, from the first device 10 during the conflict determination period, the data transmission from the first device 10 is prioritized, and the data transmission of non-video data from the second device 50 is performed after a video data transmission side data transmission interval of FIG. 6C ends.

FIGS. 6A and 6C illustrate the case where the transmission of non-video data from the first device 10 to the second device 50 is prioritized. However, the case where the transmission of non-video data from the second device 50 to the first device 10 is prioritized can also be realized in a similar way. In the case where the transmission of non-video data from the second device 50 to the first device 10 is prioritized, only the second device 50 transmits a signal during the conflict determination period. In the case where the monitoring part 30 of the first device 10 determines that there is a signal, such as a data transfer notification, from the second device 50 during the conflict determination period, the data transmission from the second device 50 is prioritized, and the data transmission of non-video data from the first device 10 is performed after a video data reception side data transmission interval ends.

The conflict determination periods in FIGS. 6A and 6C are respectively set to be shorter than the video data reception side data transmission interval and the video data transmission side data transmission interval. If the conflict determination period is set to be long, the signal conflict between the transmission side and the reception side can be avoided reliably. However, there is a concern that the band used for non-video data transmission may be impaired by the conflict determination period. If the conflict determination period is set to be short, the band used for non-video data transmission is secured. However, there is a concern that it may be difficult to reliably avoid signal conflict. The length of the conflict determination period is determined by whether avoiding signal conflict or securing the band used for non-video data transmission is prioritized.

As described above, according to the embodiment, whether there is a signal from the other party of data transmission is determined in the conflict determination period preceding the video data reception side data transmission interval or the video data transmission side data transmission interval, and data transmission to the other party is performed in the case where a signal is not present during the conflict determination period. As a result, data signal conflict can be avoided in the data transmission of non-video data.

In the embodiment, the transmission/reception timing setting signal setting the video period and the video blanking period in the transmission timing is output by the Tx control part 22 of the first device 10. However, the disclosure is not limited thereto. It may also be that the Rx control part 74 of the second device 50 outputs the transmission/reception timing setting signal to the Rx data transmission/reception circuit 66, and the Rx data transmission/reception circuit 66 transmits the transmission/reception timing setting signal, as I2C data, to the first device 10. In such case, the first device 10 controls the transmission of video data and non-video data in accordance with the video period and the video blanking period set in the transmission/reception timing setting signal that is transmitted.

Second Embodiment

Then, the second embodiment is described. The embodiment differs from the first embodiment in the point that the non-video data is transmitted more stably. However, the remaining configuration is the same as the configuration of the first embodiment. Therefore, for the configuration same as the first embodiment, symbols same as those of the first embodiment are labeled, and the detailed description is omitted.

Figure 7A:
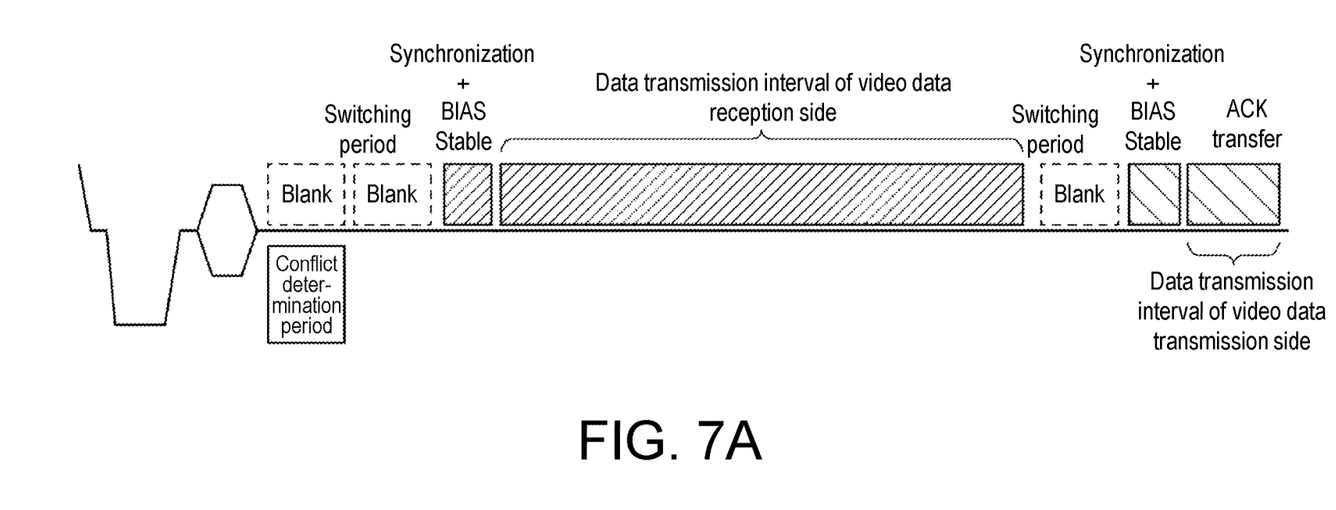
FIG. 7A is a schematic diagram illustrating an example of a transmission timing of non-video data from a second device, which is a video data reception side, to a first device, which is a video data transmission side, in a second embodiment.
Figure 7B:
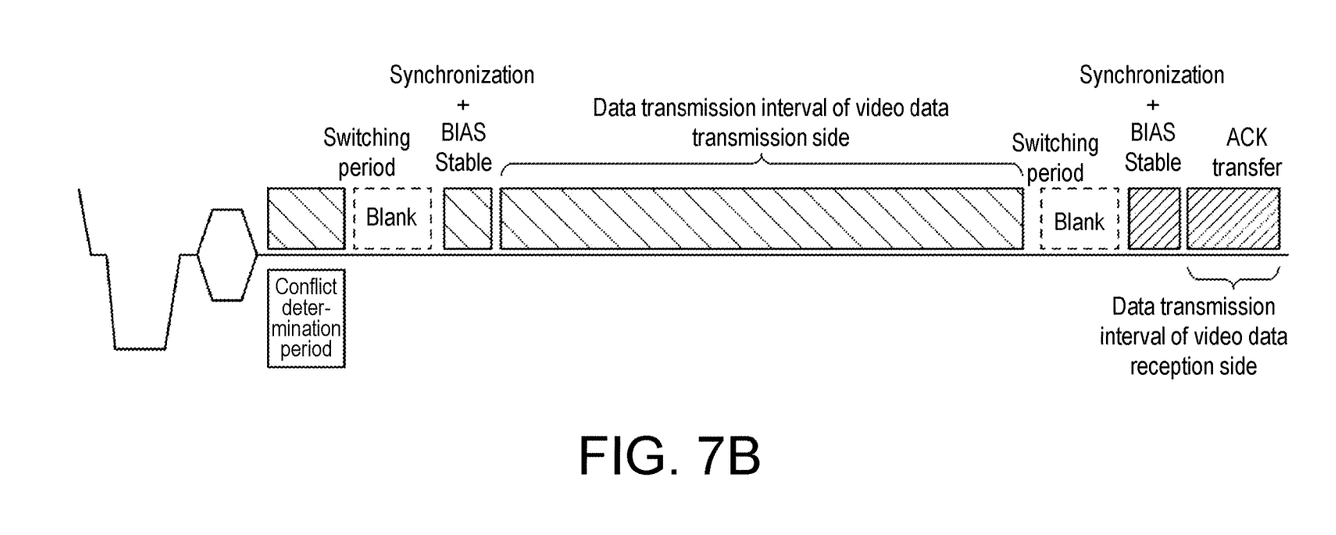
FIG. 7B is a schematic diagram illustrating an example of a transmission timing of the non-video data from the first device, which is the video data transmission side, to the second device, which is the video data reception side, in the second embodiment.

FIG. 7A is a schematic diagram illustrating an example of a transmission timing of non-video data from the second device 50, which is the video data reception side, to the first device 10, which is the video data transmission side. FIG. 7B is a diagram explaining an example of a transmission timing of the non-video data to the second device 50, which is the video data reception side, from the first device 10, which is the video data transmission side.

As shown in FIGS. 7A and 7B, in the embodiment, the point that the conflict determination period is provided at the beginning of the line transfer of the video blanking period is common to the first embodiment. However, the point in which a switching period and a BIAS stable period are provided after the conflict determination period is different from the first embodiment. The switching period is a blank period in which no signal is transmitted and which is provided to smoothly switch to the subsequent video data reception side data transmission interval or video data transmission side data transmission interval. The BIAS stable period is a period which assumes a case where a signal is unstable or a case where various processing delays between the transmission side and the reception side occur and synchronizes the transmission side and the reception side, respectively.

As shown in FIG. 7A, in the case where the monitoring part 70 of the second device 50 determines that there is no signal (blank) in the conflict determination period, the transmission part 72 of the second device 50 executes the data transmission of non-video data to the first device 10 during the video data reception side data transmission interval of FIG. 7A following the switching period and the BIAS stable period. Although FIG. 7A illustrates the transmission of non-video data from the second device 50 to the first device 10, the same applies to the case where non-video data is transmitted from the first device 10 to the second device 50. That is, in the case where the monitoring part 30 of the first device 10 determines that there is no signal (blank) in the conflict determination period, the transmission part 32 of the first device 10 executes the data transmission of non-video data to the second device 50 during the video data transmission side data transmission interval after the switching period and the BIAS stable period.

As shown in FIG. 7B, in the case where the monitoring part 70 of the second device 50 determines that there is a signal, such as a video data transmission side data transfer notification, from the first device 10 during the conflict determination period, the data transmission from the first device 10 is prioritized, and the data transmission of non-video data from the second device 50 is performed following the switching period and the BIAS stable period after the video data transmission side data transmission interval of FIG. 7B ends.

FIG. 7B illustrates the case where the transmission of non-video data from the first device 10 to the second device 50 is prioritized, the same applies to the case where the transmission of non-video data from the second device 50 to the first device 10 is prioritized. In the case where the monitoring part 30 of the first device 10 determines that there is a signal, such as a data transfer notification, from the second device 50 during the conflict determination period, the data transmission from the second device 50 is prioritized, and the data transmission of non-video data from the first device 10 is performed following the switching period and the BIAS stable period after the video data reception side data transmission interval ends.

As described above, according to the embodiment, following the conflict determination period, the switching period and the BIAS stable period are provided. The switching period is provided for smoothly performing switching to the video data reception side data transmission interval or the video data transmission side data transmission interval. The BIAS stable period is provided for assuming the case where the signal is unstable or the case where various processing delays between the transmission side and the reception side occur and synchronizing the transmission side and the reception side, respectively. Accordingly, it is possible to stably transmit non-video data.

What is claimed is:

1. A data transmission device, comprising:
a video data transmission part, transmitting video data from a first device to a second device during a video period as a timing of transmitting the video data;
a non-video data transmission part, transmitting non-video data between the first device and the second device during a video blanking period as a timing of transmitting the non-video data; and
a monitoring part, during the video blanking period, controlling the non-video data transmission part, so as to set a conflict determination period preceding an interval transmitting the non-video data as a first period in which only the first device is able to transmit a signal and, in response to presence of the signal from the first device, stop transmission of the non-video data from the second device to the first device.

2. The data transmission device as claimed in claim 1, comprising a monitoring part, controlling the non-video data transmission part, so as to set the conflict determination period as a second period in which only the second device is able to transmit a signal and, in response to presence of the signal from the second device in the conflict determination period, stop transmission of the non-video data from the first device to the second device.

3. The data transmission device as claimed in claim 2, wherein the monitoring part controls the non-video data transmission part, so as to execute each of transmission of the non-video data from the second device to the first device in response to absence of the signal from the first device and transmission of the non-video data from the first device to the second device in response to absence of the signal from the second device during the conflict determination period.

4. The data transmission device as claimed in claim 3, wherein, during the video blanking period, a blank period in which no signal is transmitted and a period for synchronizing transmission between the first device and the second device are provided between the conflict determination period and the interval transmitting the non-video data.

5. The data transmission device as claimed in claim 1, wherein the conflict determination period is set to be longer in response to avoiding data signal conflict being prioritized than in response to securing a band used for transmission of the non-video data being prioritized.

6. The data transmission device as claimed in claim 2, wherein the conflict determination period is set to be longer in response to avoiding data signal conflict being prioritized than in response to securing a band used for transmission of the non-video data being prioritized.

7. The data transmission device as claimed in claim 3, wherein the conflict determination period is set to be longer in response to avoiding data signal conflict being prioritized than in response to securing a band used for transmission of the non-video data being prioritized.

8. The data transmission device as claimed in claim 4, wherein the conflict determination period is set to be longer in response to avoiding data signal conflict being prioritized than in response to securing a band used for transmission of the non-video data being prioritized.

9. A data transmission method, comprising:
a video data transmission process of transmitting video data from a first device to a second device during a video period as a timing of transmitting the video data;
a monitoring process of, in a video blanking period as a timing of transmitting non-video data, during a conflict determination period preceding an interval transmitting the non-video data, stopping transmission of the non-video data from the second device to the first device in response to presence of a signal from the first device and stopping transmission of the non-video data from the first device to the second device in response to presence of a signal from the second device; and a non-video data transmission process of, in the monitoring process, during the conflict determination period, executing the transmission of the non-video data from the second device to the first device in response to absence of the signal from the first device and executing the transmission of the non-video data from the first device to the second device in response to absence of the signal from the second device.

\* \* \* \* \*